Jan. 5, 1937.  C. E. BENNETT  2,066,320
ELECTRIC CABLE SYSTEM
Filed Oct. 22, 1935  2 Sheets-Sheet 1
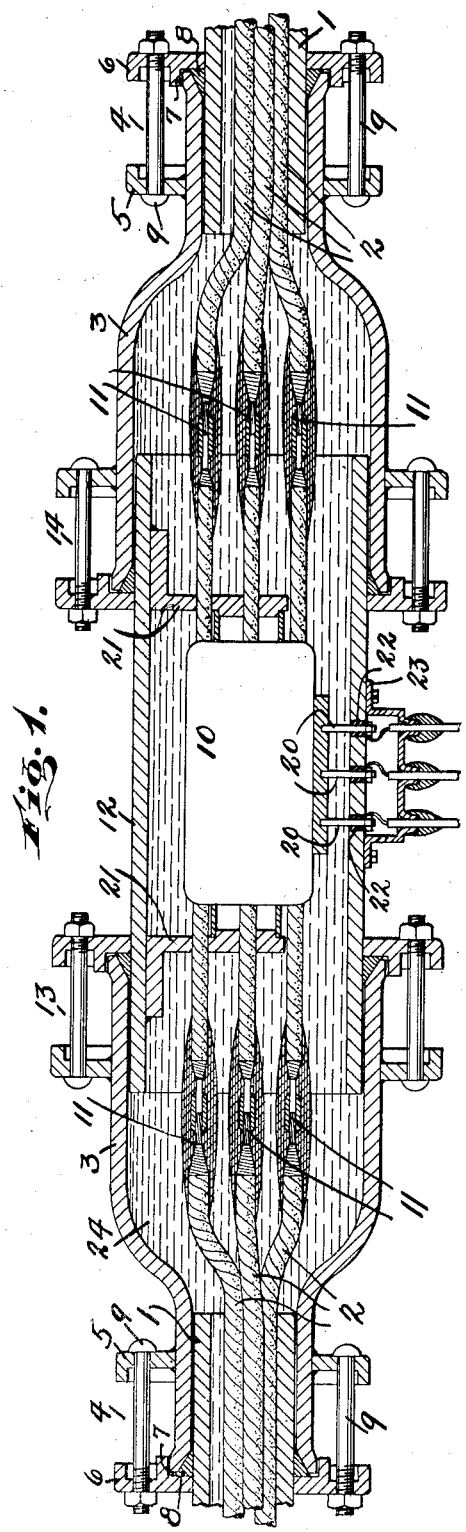
INVENTOR
Charles E. Bennett.
BY
Kiddle, Buhell and Montgomery
ATTORNEYS.

Jan. 5, 1937. C. E. BENNETT 2,066,320
ELECTRIC CABLE SYSTEM
Filed Oct. 22, 1935 2 Sheets-Sheet 2
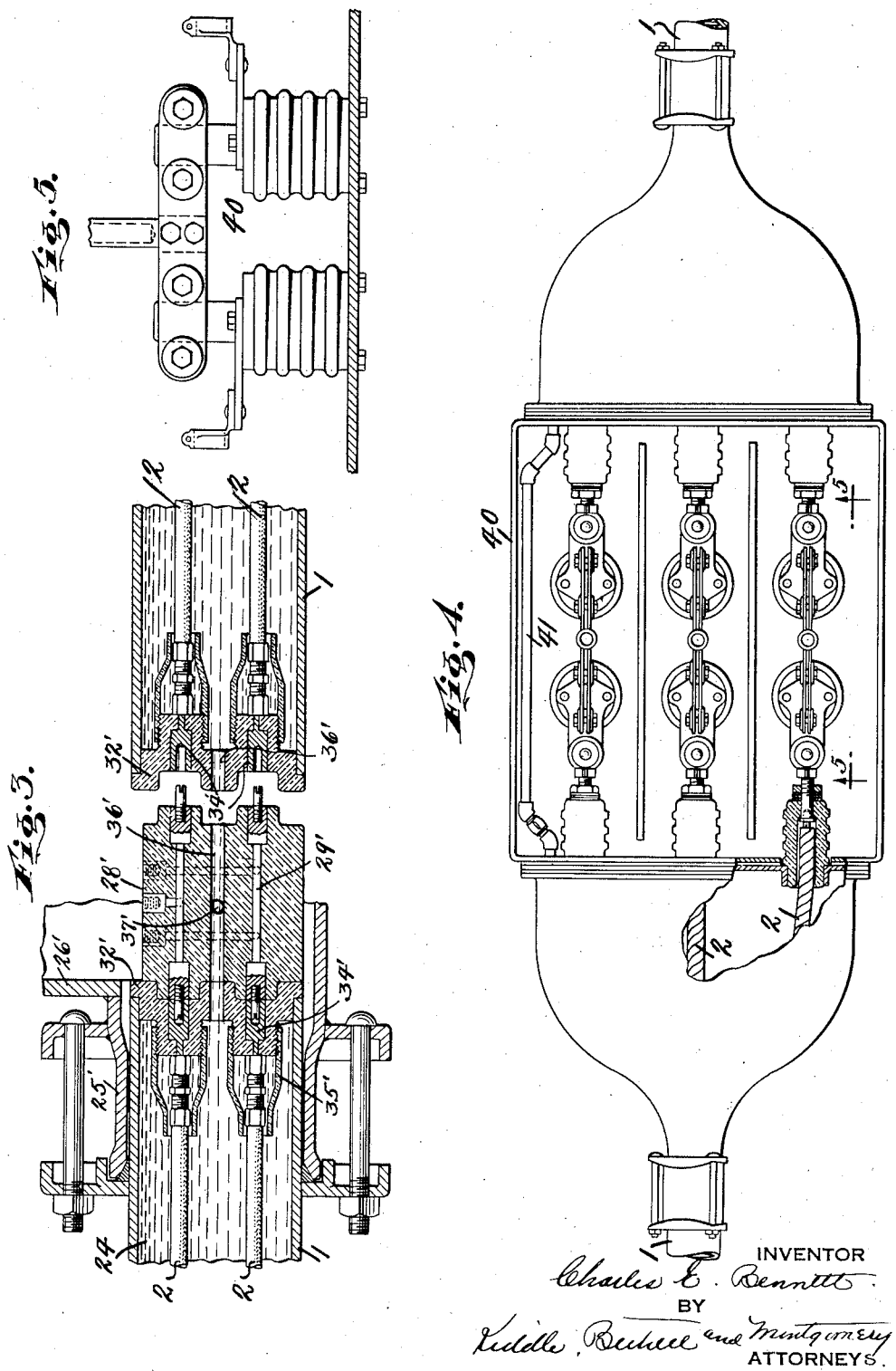

Patented Jan. 5, 1937

2,066,320

UNITED STATES PATENT OFFICE 2,066,320

ELECTRIC CABLE SYSTEM

Charles E. Bennett, Ridgewood, N. J., assignor to The Okonite-Callender Cable Company, Incorporated, Paterson, N. J., a corporation of New Jersey Application October 22, 1935, Serial No. 46,064

5 Claims. (Cl. 247—3)

This invention relates to electric distribution systems particularly adapted for use in connection with the distribution of power for street lighting, house lighting and other domestic or commercial loads, and has for one of its objects the provision of a construction wherein overhead lines are dispensed with, the feeder lines for the system being installed underground in a pipe line filled with oil which is maintained under superatmospheric pressure, the step-down transformers by which the power from the feeder lines is stepped down being installed directly in the pipe line and submerged in the oil therein.

This invention presents many advantages both from an operating and construction viewpoint, as compared with existing systems; for example, it eliminates overhead lines, expensive manholes, the need for high tension transformer bushings, the cable being tapped to the bus which serves the transformer. Space requirements and installation costs are also reduced to a minimum. The entire transformer construction is under oil and inside the pipe so that there are no external connections on the high side. This obviously eliminates the constant likelihood of breaking down of a bushing and the transformer being submerged in oil will be properly cooled. Inasmuch as the oil is under superatmospheric pressure the transformer will be improved dielectrically. It will be appreciated also that by installing the transformers directly in the pipe line with the cables, the expensive Y-joints and T-joints necessary in overhead lines as well as duct systems are eliminated.

It will be appreciated also that the present invention provides a construction by which the appearance of the property on which it is installed is materially improved, all equipment being buried. It will be appreciated also that heavy maintenance costs due to tree trimming, damage caused by lightning in storms, changes in driveways, etc. on the property are eliminated by the present invention.

In the accompanying drawings:

Fig. 1 is a longitudinal section showing a section of my improved system with a transformer installed directly in the oil filled pipe line with the cables;

Fig. 2 is a similar view showing the construction employed where it is desirable to run a branch line at an angle to the main line;

Fig. 3 is a view of a modification of the structure of Fig. 2;

Fig. 4 is a plan view of a junction box employed in my improved system; and

Fig. 5 is a view taken substantially from the line 5—5 of Fig. 4.

Referring to the drawings in detail, my improved system comprises a pipe line 1, preferably of metal, for example, and made in sections of any desired length depending upon the installation site. Drawn into this pipe line is a plurality of insulated conductors 2, suitably insulated with the customary paper insulation, for example, similar to the disclosure of my copending application Serial No. 666,032, filed April 13, 1933.

The conductors 2 are connected to any suitable source of power available, as will be understood.

At any desired intervals along the pipe line adjacent lengths or pipe sections are left spaced apart as shown in Fig. 1, for instance, and each end of these adjacent sections of the pipe line is equipped with a sleeve 3 which is attached to the pipe line in a liquid tight fashion by a coupler 4. Each of these couplers comprises a gland 5 surrounding the sleeve and welded or otherwise permanently attached thereto. At the extreme outer end of each of the sleeves 3 I provide a ring or disc 6. Each of these discs is cut back as shown at 7 to receive a metal clad washer 8 which surrounds the pipe 1. The disc 6 and gland 5 are connected to each other by bolts 9 and when these bolts are drawn up a liquid tight seal is provided by the disc 6 and washer 8 between the outer end of each of the sleeves 3 and the outside of the pipe line 1.

The adjacent ends of the sleeves 3 are left spaced apart as indicated in Fig. 1, and the space thus provided is bridged or filled in by a sleeve 12 which as shown on the drawings has its ends telescoped by the sleeves 3.

A liquid tight connection is provided between the sleeve 12 and the sleeves 3 by couplers 13 and 14 which are similar to the couplers 4 above referred to.

It will be understood that these joints are provided at desired intervals along the length of the system wherever desired, and they are provided for the insertion directly into the pipe line 1 of the transformers 10. The primary winding of each transformer is connected to the conductors 2 by splices such as shown at 11 or in any other suitable fashion.

It will be understood that the three conductors 2 may be connected to each transformer, or that a pair of conductors may be connected to a transformer, another pair to the next transformer, and so on, the third conductor acting as a through connection. It is to be understood also that a transformer may not be installed at each joint, the other joints being available in the future as the load demand on the system increases.

Each transformer is held in place in the pipe line by brackets 21 which, as illustrated in Fig. 1, are welded to the inside of the sleeve 12. The low tension side of each transformer 10 is provided with taps shown diagrammatically at 20 which are brought out through the wall of the sleeve 12 through sealing bushings 22. A housing 23 is bolted and sealed to the exterior of the sleeve 12 at these connections as shown in Fig. 1. The external circuits, as also shown in Fig. 1, are wiped to the housing 23, their ends being coupled to the transformer leads within the housing.

The pipe line is filled with oil 24 maintained under superatmospheric pressure, of the order of 200 pounds to the square inch, for example, in which the transformers 10 as well as the conductors 2 will at all times be submerged.

It will be seen that this construction possesses many advantages over prior practices, in which the transformers are separate and apart from the cable system, it being necessary to run a separate line from the cable to the transformer, or if in a through circuit, to make a Y or a T-joint. It has been customary also in prior underground systems to install the transformers in a specially built manhole, which in the practice of my invention are eliminated by reason of the fact that the transformers are installed directly in the pipe line with the cable conductors. It will be appreciated also that to install the transformers in the cable pipe line is commercially feasible and practicable in that the oil will provide for transformer cooling, and will improve the dielectric characteristics of the transformer, while the pipe line will be of sufficiently rugged construction to protect the transformer against injury from outside sources.

It may be necessary or desirable in some instances to lay a branch line at an angle to the pipe line 1 and in Figs. 2 and 3 I have shown constructions particularly well adapted for this purpose. In the structure of Fig. 2 it will be seen that the adjacent ends of two adjacent lengths of the pipe line 1 are connected together by a sleeve 25 which is provided with an offset 26 extending at an angle to the sleeve and which, as will be understood, is adapted to be joined to and constitute a continuation of a pipe line which it is desired to lay at an angle to the pipe line 1. The sleeve 25 and offset 26 are welded to each other to constitute or provide a rigid construction and the sleeve is secured to the two adjacent pipe line sections 1 by couplers 27 similar to the couplers 4, 13 and 14 above referred to.

Within the pipe line 1 and sleeve 25 I provide a construction whereby the conductors 2 may be tapped so that the feeder conductors in the offset 26 can be connected to the conductors within the pipe line. This construction comprises a central block of insulation, porcelain, for example, designated 28, this block being provided with conducting rods 29 which may be of copper, for instance, connections, shown at 30, being provided in the block to the rods 29, the connections 30 extending to the surface of the block 28 abreast of the end of the offset 26. The feeders in the offset 26, it will be understood, are connected to the connections 30.

Opposite ends of the block 28 are reduced in diameter as shown at 31 to receive bushings 32 which may be of porcelain, for instance, these bushings fitting the ends of the sections of the pipe 1, and each bushing being provided with an annular flange 33 which bears against the end of the pipe line as shown in Fig. 4. These bushings fit over the reduced ends of the block 28 and are equipped with rods 34 which are coupled to the rods 29 in the block 28. A bushing 35 surrounds these couplers. These bushings 35 are of insulating material, porcelain for instance, and screwed upon the end of the bushings 32.

The bushings 32 and block 28 are provided with a longitudinal passageway or channel 36 to establish a through oil passage from one side of the structure to the other, and the block 28 is provided with a cross-passage 37 for the passage of oil to the branch 26. When this branch is not in service, this passage 37 may be closed by a suitable valve, or otherwise sealed.

The construction shown in Fig. 3 is quite similar to that shown and just described in connection with Fig. 2. Here I have provided an offset 26' welded to a sleeve 25' attached in a liquid tight fashion to the adjacent ends of the two sections of the pipe line 1. The central block of this construction is designated 28' and each end of this block receives an insulating bushing 32'. The bushings 32' fit the inside of the pipe line 1 and each is provided with a conducting connector 34', one end of each of which is connected to conducting rods 29' in the block 28', the other end being coupled as shown to the conductors 2. A sleeve of insulating material 35' surrounds each of these couplers, each of these sleeves being screwed upon the outer end of the bushings 32'.

The block 28' and bushings 32' are provided with longitudinal oil channel 36' and the block with cross channel 37'.

My improved system is provided with junction boxes illustrated in Figs. 4 and 5 and designated 40. These junction boxes are primarily provided for the purpose of sectionalizing the system, and as will be understood are installed wherever desired along the pipe line. These boxes are not filled with oil, the oil in the pipe line passing through the boxes through pipe 41, which, as will be seen from Fig. 4, communicates with the pipe line at each side of the box.

It will be understood that my improved system will be equipped with overload circuit breakers or protective fuses.

It will be understood also that so far as branch lines are concerned, such as illustrated in Figs. 2 and 3, the cross channels 37 and 37' may be sealed by suitable valves or in other fashion, should it be desired to hold the branch line as a standby. It will be appreciated also that transformers 10 may not be installed at all the joints as illustrated in Fig. 1 on the original installation, transformers being installed later as the load on the line increases.

It is to be understood that changes may be made in the details of construction and arrangement of parts herein described, within the purview of my invention.

What I claim is:—

1. In an electric distribution system, the combination of a feeder line comprising a pipe line, insulated conductors and a transformer in the pipe, one winding of said transformer being connected to the said conductors, transformer taps extending through the pipe line for the attachment of external branch circuits to another winding of said transformer, said taps being sealed into the wall of the pipe line, said pipe line being filled with a body of oil under superatmospheric pressure which surrounds the said conductors and the said transformer and in which the conductors and transformer are at all times immersed.

2. In an electric distribution system, the combination of a feeder line comprising a sectional pipe line, insulated conductors within said pipe line, spaced sleeves sealed to the spaced adjacent ends of pipe line sections, a sleeve bridging the space between said first mentioned sleeves and sealed thereto, a transformer within the last mentioned sleeve mounted on a bracket secured to the interior of the said last mentioned sleeve, one winding of said transformer being connected to said insulated conductors, the other winding of said transformer being tapped and the taps extending through the last mentioned sleeve and sealed therein, and a body of oil under superatmospheric pressure surrounding said conductors and transformer and in which said conductors and transformer are at all times immersed.

3. An electric distribution system comprising in combination a pipe line, insulated conductors and transformers within said pipe line, the transformers being electrically connected to the cable conductors, a body of oil under superatmospheric pressure filling the pipe line and surrounding said conductors and transformers, the said conductors and transformers being immersed in said oil, a branch pipe line connection from said pipe line for the reception of other cable conductors, means for coupling said last mentioned cable conductors to the first mentioned cable conductors, the said branch pipe line and the first mentioned pipe line communicating with each other whereby the said conductors and transformers are surrounded by and immersed in the one body of oil.

4. In an electric distribution system the combination of a sectional pipe line, cable conductors in the pipe line, the adjacent ends of some of the sections of said pipe line being disposed in spaced apart relation, a sleeve surrounding the ends of such sections of the pipe line and secured liquid-tight thereto, said sleeve being provided with a branch extending at an angle to the main pipe line for the reception of additional cable conductors, and a fixture within said sleeve for coupling the first mentioned cable conductors to the last mentioned cable conductors, said fixture being provided with a longitudinal channel and a cross channel for oil whereby the main pipe line and the branch line may be kept filled with oil under the same pressure.

5. An electric distribution system comprising in combination a pipe line, insulated conductors and transformers within said pipe line, the transformers being connected to the conductors, said pipe line being filled with a body of oil maintained under superatmospheric pressure surrounding said conductors and transformers and in which said conductors and transformers are at all times immersed, junction boxes in said pipe line, and a pipe in each junction box for maintaining communication between the pipe line at one side of the junction box and the pipe line at the opposite side of the junction box.

CHARLES E. BENNETT.